US012405650B2

(12) United States Patent
Looby et al.

(10) Patent No.: US 12,405,650 B2
(45) Date of Patent: Sep. 2, 2025

(54) INTERFACE FOR HIGH-VOLTAGE APPLICATIONS

(71) Applicant: Allegro MicroSystems, LLC, Manchester, NH (US)

(72) Inventors: Christy Looby, Musselburgh (GB); Colin Hall, West Linton (GB); James McIntosh, East Lothian (GB)

(73) Assignee: Allegro MicroSystems, LLC, Manchester, NH (US)

( * ) Notice: Subject to any disclaimer, the term of this patent is extended or adjusted under 35 U.S.C. 154(b) by 438 days.

(21) Appl. No.: 18/059,555

(22) Filed: Nov. 29, 2022

(65) Prior Publication Data

US 2024/0176405 A1 May 30, 2024

(51) Int. Cl.
*G06F 1/26* (2006.01)
*G06F 1/3296* (2019.01)

(52) U.S. Cl.
CPC ........... *G06F 1/266* (2013.01); *G06F 1/3296* (2013.01)

(58) Field of Classification Search
CPC .................. G06F 1/266; G06F 1/3296
See application file for complete search history.

(56) References Cited

U.S. PATENT DOCUMENTS

| | | | |
|---|---|---|---|
| 6,631,066 B1* | 10/2003 | Smith | G05F 1/613 361/103 |
| 9,496,708 B2 | 11/2016 | Chappell et al. | |
| 9,985,571 B2* | 5/2018 | Yamanaka | H02P 31/00 |
| 2002/0109952 A1* | 8/2002 | Rapsinski | H02H 9/042 361/91.1 |
| 2014/0118867 A1* | 5/2014 | Becerra | H02H 7/09 361/33 |
| 2017/0317638 A1* | 11/2017 | Yamanaka | H02H 7/09 |
| 2019/0058326 A1* | 2/2019 | Esposito | H02H 1/0007 |
| 2021/0218317 A1 | 7/2021 | Metivier et al. | |
| 2023/0074929 A1* | 3/2023 | Sole | G06F 1/3296 |

* cited by examiner

*Primary Examiner* — Jaweed A Abbaszadeh
(74) *Attorney, Agent, or Firm* — Daly, Crowley, Mofford & Durkee, LLP (57) ABSTRACT

An interface circuit, comprising: I/O circuitry configured to couple one or more first terminals with one or more second terminals; a voltage regulator configured to power the I/O circuitry; a restrictor element that is disposed between the voltage regulator and the I/O circuitry, the restrictor element being disposed on a circuit path that connects the voltage regulator to the I/O circuitry, the restrictor element being configured to open the circuit path and disconnect the voltage regulator from the I/O circuitry when an electrical current that is being supplied to the I/O circuitry exceeds a threshold; and a voltage suppressor that is disposed on the circuit path that connects the voltage regulator to the I/O circuitry, the voltage suppressor being disposed between the restrictor element and the I/O circuitry, the voltage suppressor being configured to limit, to a first voltage value, a voltage that is input into the I/O circuitry.

25 Claims, 7 Drawing Sheets

INTERFACE FOR HIGH-VOLTAGE APPLICATIONS

BACKGROUND

An electronic system may include a controller as well as other control circuitry. The controller may communicate with an auxiliary device that has a different power supply than the controller. To ensure high reliability of the electronic system, the electronic system may utilize various protection mechanics that electrically separate the auxiliary device from the controller and prevent electrical overstress or failure events that take place at the auxiliary device from damaging the controller.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, an interface circuit is provided, comprising: an input-output (I/O) circuitry that is configured to couple one or more first terminals with one or more second terminals; a voltage regulator configured to power the I/O circuitry; a restrictor element that is disposed between the voltage regulator and the I/O circuitry, the restrictor element being disposed on a circuit path that connects the voltage regulator to the I/O circuitry, the restrictor element being configured to open the circuit path and disconnect the voltage regulator from the I/O circuitry when an electrical current that is being supplied to the I/O circuitry exceeds a threshold; a voltage suppressor that is disposed on the circuit path that connects the voltage regulator to the I/O circuitry, the voltage suppressor being disposed between the restrictor element and the I/O circuitry, the voltage suppressor being configured to limit, to a first voltage value, a voltage that is input into the I/O circuitry; and a diagnostic circuit that is configured to: (i) compare a second voltage value to a voltage that is output by the voltage regulator, and (ii) when the voltage that is output by the voltage regulator matches the second voltage value, output an indication that the voltage regulator is malfunctioning, wherein the second voltage value is less than the first voltage value.

According to aspects of the disclosure, an interface circuit is provided, comprising: a diagnostic terminal; an input-output (I/O) circuitry that is configured to couple one or more first terminals with one or more second terminals; a voltage regulator configured to power the I/O circuitry; and a diagnostic circuit that is configured to: (i) compare a first voltage value to a voltage that is output by the voltage regulator, and (ii) when the voltage that is output by the voltage regulator matches the first voltage value, output, on the diagnostic terminal, an indication that the voltage regulator is malfunctioning.

According to aspects of the disclosure, an interface circuit is provided, comprising: an input-output (I/O) circuitry that is configured to couple one or more first terminals with one or more second terminals; a voltage regulator configured to power the I/O circuitry; a restrictor element that is disposed between the voltage regulator and the I/O circuitry, the restrictor element being disposed on a circuit path that connects the voltage regulator to the I/O circuitry, the restrictor element being configured to open the circuit path and disconnect the voltage regulator from the I/O circuitry when an electrical current that is being supplied to the I/O circuitry exceeds a threshold; and a voltage suppressor that is disposed on the circuit path that connects the voltage regulator to the I/O circuitry, the voltage suppressor being disposed between the restrictor element and the I/O circuitry, the voltage suppressor being configured to limit, to a first voltage value, a voltage that is input into the I/O circuitry.

According to aspects of the disclosure, an interface circuit is provided, comprising: one or more first terminals for receiving at least one control signal from an electronic control unit (ECU); an input-output (I/O) circuit; a motor driver that is configured to drive a motor with an electrical current that is provided by a battery; a control logic that is configured to receive a control signal from the ECU and operate the motor driver based on the control signal, the control signal being received via the I/O circuit; and a first voltage regulator that is arranged to power the I/O circuit with the electrical current that is provided by the battery, the first voltage regulator being configured receive a same voltage as a voltage that is output by the battery and step down the received voltage.

According to aspects of the disclosure, a system is provided, comprising: a battery; a motor; an ECU that is configured to a generate a control signal; an interface circuit that is configured to couple the motor to the ECU, the interface circuit including: an I/O circuit; a motor driver that is configured to drive the motor with an electrical current that is provided by the battery; a control logic that is configured to receive the control signal from the ECU, via the I/O circuit, and operate the motor driver based on the control signal; and a first voltage regulator that is arranged to power the I/O circuit with the electrical current that is provided by the battery, the first voltage regulator being configured receive a same voltage as a voltage that is output by the battery and step down the received voltage.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

In an embedded power system, a high-voltage microchip typically interfaces with a low-voltage microcontroller. This interface can be in the form of a bus across which digital input-output (I/O) is transferred. The internal power supply in the high-voltage component has to be regulated down to a suitable low voltage (VIO) that the microcontroller is rated for. The microcontroller will interface with a network of other peripheral components so it is imperative that even if one of those peripheral components develops a fault, the microcontroller is still able to control the others.

In a high voltage system, there are multiple stress factors that can exacerbate latent defects in the device, such as reverse-battery, line transients, load dump, over-current due to short circuits, and over-voltage events. The regulator for VIO separates the high voltage from VIO by means of a pass device that it controls. In a safety-critical system, this pass device represents a potential single point of failure. If it fails, then VIO can exceed the Absolute Maximum Rating (AMR) of the connected microcontroller and cause the microcontroller to be rendered inoperable. A latent defect in the pass element that isn't detected in production could, during the service life of the system, cause a catastrophic failure.

According to the present disclosure, an interface for coupling high voltage circuitry to a low-voltage microcontroller is provided. In one aspect, the interface may be arranged to employ a combination of detection and preventative elements to keep the microcontroller inside its AMR. In another aspect, the interface may be configured to prevent VIO from exceeding the AMR and sink current when the VIO exceeds a threshold. In yet another aspect, the interface may be configured to open the connection from VIO when excessive current flows.

Figure 1:
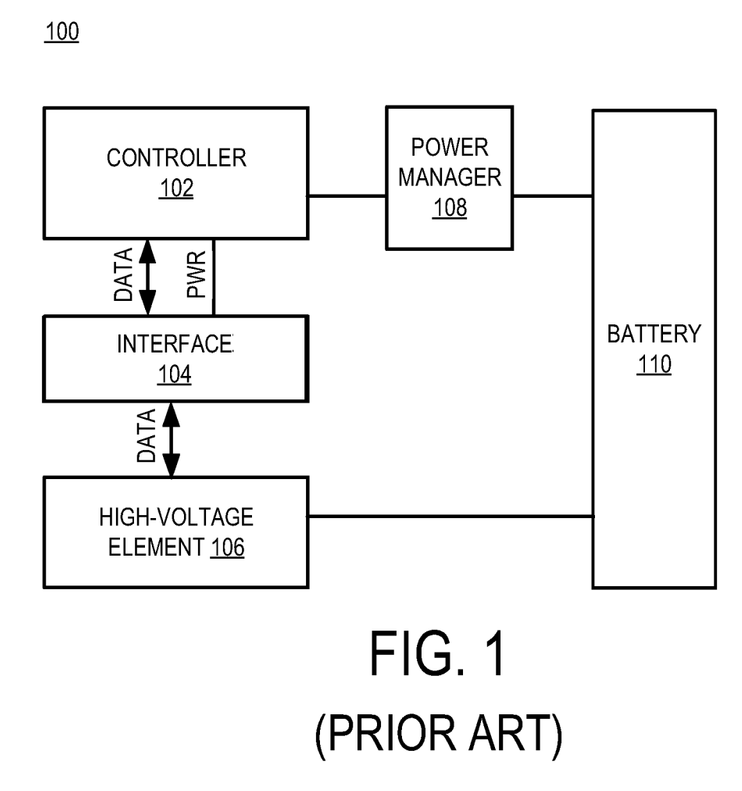
FIG. 1 is a diagram of an example of a system, according to the prior art.

FIG. 1 is a diagram of an example of a system 100, according to the prior art. As illustrated, the system 100 may include a controller 102 that is coupled to a high-voltage element 106 via an interface 104. The controller 102 may include an Application-Specific Integrated Circuit (ASIC), a general-purpose processor (e.g., an ARM-based processor, MIPS processor, an x86 processor, etc.), a Field-Programmable Gate Array (FPGA), and or any other suitable type of processing circuitry. The high-voltage element 106 may include an industrial controller, a motor driver, a power converter and/or any other suitable type of circuitry or device.

The controller 102 may be powered with a low-voltage signal (e.g., 5V). The low-voltage signal may be obtained by using a power manager 108 to step down a voltage provided by a battery 110. The high-voltage element 106 may be powered directly by the battery 110. In one example, the battery 110 may output 50V, and the power manager 108 may reduce the battery output to 5V.

The interface 104 may be arranged to facilitate the flow of data or other signals between the high-voltage element 106 and the controller 102. For example, in operation, the interface 104 may receive data or other signals from the controller 102 and forward the data or other signals to the high-voltage element 106. As another example, the interface 104 may receive data or other signals from the high-voltage element 106 and forward the data or other signals to the controller 102.

In the example of FIG. 1, the interface 104 is powered with a signal PWR that is provided by the controller 102. There are at least two disadvantages that are associated with this type of power layout. First, the number of terminals that are available on an integrated circuit is often limited, and the layout shown in FIG. 1 requires at least two terminals (Vcc and GND) on the controller 102 to be dedicated to powering the interface 104, rather than being used for other purposes. Second, the layout shown in FIG. 1 limits the pool of controllers which the interface 104 can be used with since it requires controllers to have dedicated power supply pins for the interface 104. In other words, the layout shown in FIG. 1 could make it impossible to use controllers that lack power supply pins for the interface 104 but are otherwise desirable to use with the interface 104 because they fit well a particular application.

Figure 2A:
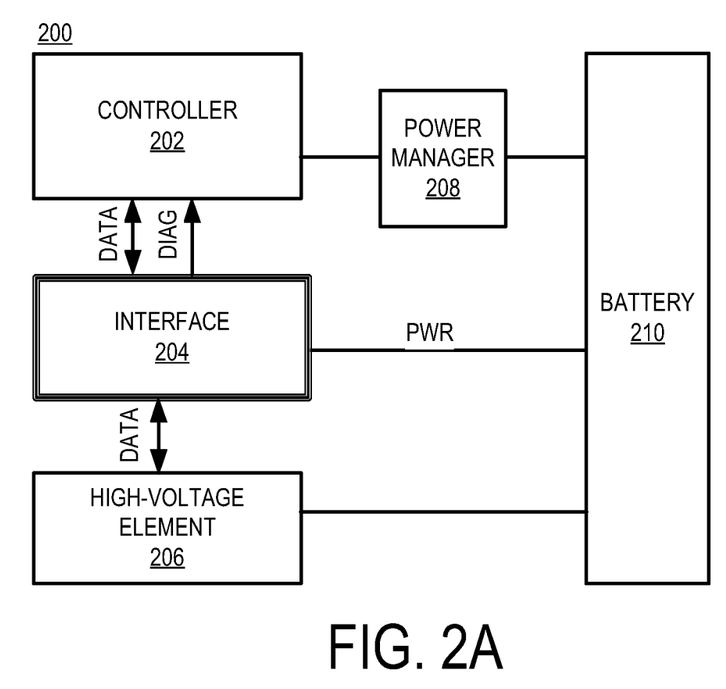
FIG. 2A is a diagram of an example of a system, according to the aspects of the disclosure.

FIG. 2A is a diagram of an example of a system 200, according to aspects of the disclosure. The system 200 addresses at least some of the disadvantages of the power layout that is shown in FIG. 1. Specifically, the system 200 features an interface 204 (between a controller 202 and a high-voltage element 206) that is powered directly by a battery 210 (rather than by the controller 202). A challenge posed by this design is that high voltage supplied directly to the interface 204, by the battery 210, may cause an overvoltage or overcurrent event at the I/O terminals of the controller 202. The I/O terminals that are used to couple the controller 202 with the interface 204. The overvoltage or overcurrent event may happen when the interface 204 (or voltage regulator inside the interface 204) fails. The overvoltage or overcurrent event may cause a catastrophic failure of the controller 202.

According to aspects of the disclosure, the interface 204 is provided with several mechanisms that reduce the likelihood (or ideally prevent) the interface 204 from causing an overvoltage or overcurrent event at the I/O terminals of the controller 202, while allowing the interface 204 to receive power from the battery 210 in a safe and dependable manner. In addition, the interface 204 is provided with a mechanism that generates a diagnostic signal that is configured to notify the controller 202 when the interface 204 is experiencing a failure. These mechanisms greatly improve the dependability of the interface 204 thus making it suitable for use in safety-critical applications. For instance, the mechanisms could help the interface 204 to achieve Automotive Safety Integrity Level D (ASIL D) certification, which may be necessary for the interface 204 to be used in many automotive applications. The mechanisms are discussed further below with respect to FIGS. 2B-4.

The controller 202 may include an Application-Specific Integrated Circuit (ASIC), a general-purpose processor (e.g., an ARM-based processor, MIPS processor, an x86 processor, etc.), a Field-Programmable Gate Array (FPGA), and or any other suitable type of processing circuitry. The high-voltage element 206 may include an industrial controller, a motor, a motor driver, an Application-Specific Integrated Circuit (ASIC), a general-purpose processor (e.g., an ARM-based processor, MIPS processor, an x86 processor, etc.), a Field-Programmable Gate Array (FPGA), and/or any other suitable type of circuitry, processing circuitry, or electrical device.

The controller 202 may be powered with a low-voltage signal (e.g., 5V). The low-voltage signal may be obtained by using a power manager 208 to step down a voltage provided by a battery 210. The high-voltage element 206 may be powered directly by the battery 210. In one example, the battery 210 may output 50V, and the power manager 208 may reduce the battery output to 5V. However, the present disclosure is not limited to any specific configuration of the battery 210 or the power manager 208.

In some implementations, the interface 204 may be arranged to facilitate the flow of data or other signals between the high-voltage element 206 and the controller 202. For example, in operation, the interface 204 may receive data or other signals from the controller 202 and forward the data or other signals to the high-voltage element 206. As another example, the interface 204 may receive data or other signals from the high-voltage element 206 and forward the data or other signals to the controller 202.

Additionally or alternatively, in some implementations, the interface 204 may be configured to generate a diagnostic signal DIAG. The diagnostic signal DIAG may be generated under the following circumstances: (i) when an internal voltage regulator of the interface 204 begins to fail, but before it has failed completely, and (ii) after the internal voltage regulator has failed. Under the nomenclature of the present disclosure, the voltage regulator is considered to have failed when the voltage output by the voltage regulator exceeds the AMR of the controller 202. For example, when no abnormalities are present in the operation of the internal voltage regulator, the diagnostic signal DIAG may have a first value (e.g., '0'). On the other hand, when the internal voltage regulator begins to fail, or after it has failed, the diagnostic signal DIAG may assume a second value (e.g., '1'). The diagnostic signal may be provided to the controller 202, and it may enable the controller 202 to take an action addressing the (impending) failure of the interface 204.

Figure 2B:
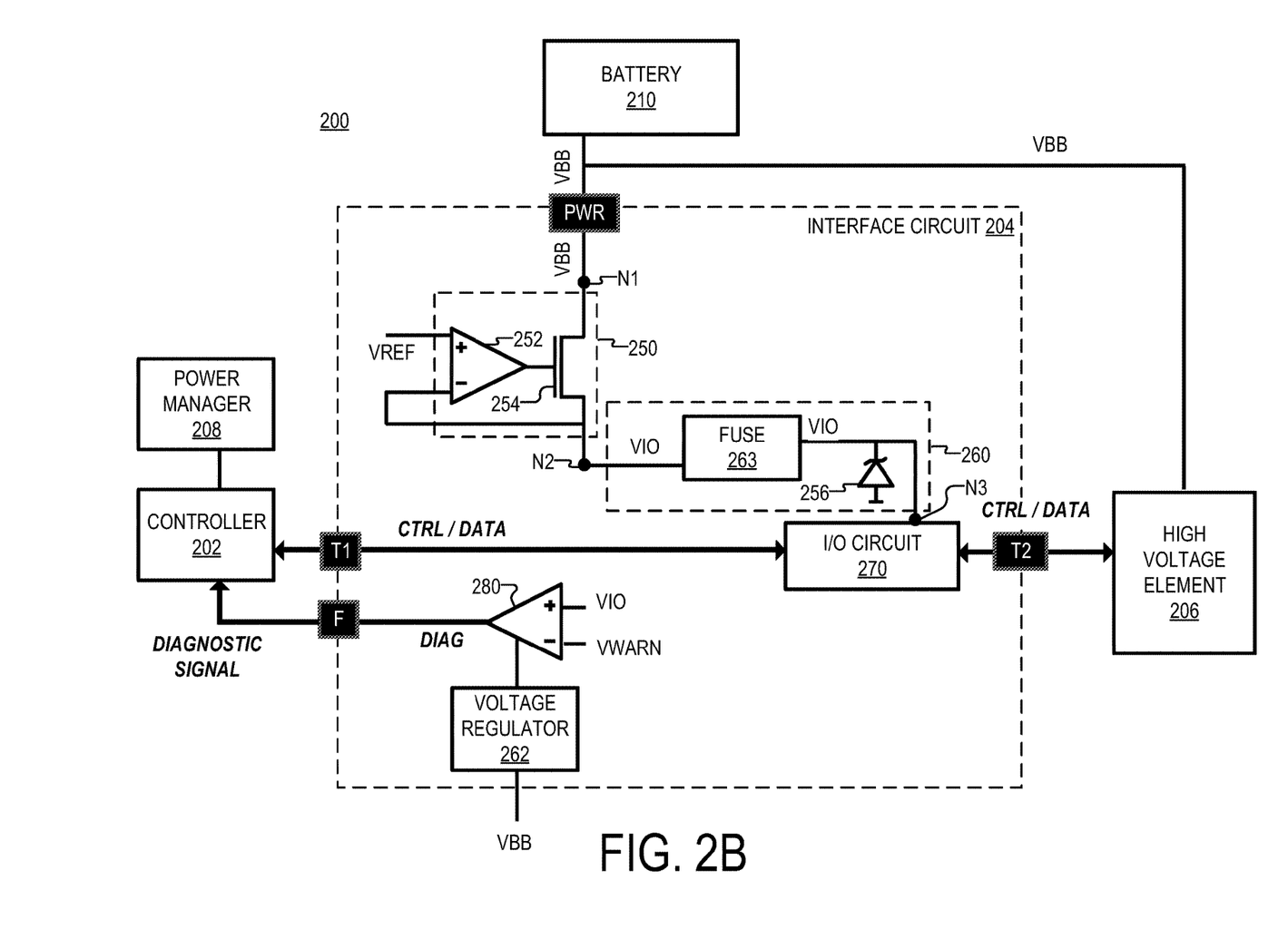
FIG. 2B is a diagram of an example of a system according to aspects of the disclosure.

FIG. 2B is a diagram of the system 200, according to aspects of the disclosure. More specifically, FIG. 2B shows one possible implementation of the interface 204 in further detail. As illustrated, the interface 204 may be coupled to the high-voltage element 206 via one or more data terminals T2. The interface circuit may include a voltage regulator 250, a protection circuit 260, an input-output (I/O) circuit 270, and a voltage comparator 280.

The voltage regulator 250 may be coupled to the battery 210 via a power terminal PWR of the interface 204. The voltage regulator may receive a voltage VBB from the battery 210 and step down the voltage VBB to a voltage VIO. In the example of FIG. 2B, the voltage (relative to ground) at node N1 is VBB and the voltage (relative to ground) at node N2 is VIO. In one example, VBB may equal 85V and VIO may equal 5 or 3.3V. The voltage regulator may include a MOSFET 254, a voltage subtractor 252, a non-linear regulator and/or any other suitable type of component or circuit. The drain of MOSFET 254 may be coupled to node N1, the source of MOSFET 254 may be coupled to node N2, and the gain of the MOSFET 254 may be coupled to the output of the voltage subtractor 252. The voltage subtractor 252 may be configured to subtract the voltage at the source of the MOSFET 254 from a reference voltage VREF. The reference voltage VREF may be equal to the value that VIO is desired to have (e.g., 5V or 3.3V) during normal operation of the voltage regulator 250 (or it may be a lower value and a voltage divider may be used in the feedback path). Although in the present example the voltage regulator 250 is implemented as a linear regulator, it will be understood that the present disclosure is not limited to any specific implementation of the voltage regulator 250.

The protection circuit 260 may be coupled to the voltage regulator 250 at node N2 and to the I/O circuit 270 at node N3. In other words, the protection circuit 260 may be disposed on the electrical path between nodes N2 and N3. The I/O circuit 270 may be powered by an electrical current that is received through the electrical path between nodes N2 and N3. The protection circuit 260 may be configured to open (or otherwise interrupt) the path between nodes N2 and N3 in the event of an overcurrent or overvoltage conduction. The protection circuit 260 may fulfill the following functions: (i) protect the I/O circuit 270 from damage by preventing excessive current or voltage from reaching the I/O circuit 270, (ii) prevent the controller 202 from damage by preventing excessive voltage or current from being applied at terminals T1. The protection circuit may include a fuse 263 that is coupled to a Zener diode 256, as shown. The Zener diode 256 may be configured to clamp the value of VIO at a clamp voltage VCL (e.g., 6.5V), and the fuse 263 may be configured to interrupt the flow of electrical current through the path between nodes N2 and N3 when it exceeds the maximum short circuit current IIO for the I/O circuit 270. In operation, when the voltage at the Zener diode 256 surpasses the value of VCL, the Zener diode 256 may increase the electrical current through the fuse 263, thus causing the fuse 263 to open the path between nodes N2 and N3 and interrupt the flow of current to the I/O circuit 270 in this way. The fuse 263 may open the path between nodes N2 and N3 when the electrical current through the fuse 263 exceeds the value of the maximum restrictor current ICN.

In some implementations, for the early warning to be effective, the fault reaction time of the system 200 needs to be designed such that when the signal DIAG is asserted, it can be acted upon by the controller 202 to isolate the fault and avoid the protection circuit 260 from having to activate. In the event of a fault causing VIO to rise to the battery voltage VBB, the signal DIAG should assert and be acted upon in microseconds. The clamp circuit (e.g., the Zener diode 256) may protect the I/O circuit 270 during the fault reaction time. If the maximum fault reaction time is exceeded, the fuse blow time (of the fuse 263) should be designed to be shorter than the time the I/O circuit 270 can endure the excess power being dissipated in its components. This allows time for the system 200 to be put in a safe state before the fuse 263 opens the line between nodes N2 and N3, and communication with the controller 202 is lost.

Although in the example of FIG. 2B a Zener diode is used to clamp the voltage at node N3, it will be understood that alternative implementations are possible in which another type of clamp circuit is used, such as a resistor. Although in the example of FIG. 2B, the fuse 263 is used to constrict the current through the path N2-N3, alternative implementations are possible in which another current restrictor is used, such as an active current limiter.

The I/O circuit 270 may include any suitable type of circuitry that is configured to (i) receive a first data set at terminals T1 and output a second dataset at terminals T2. In some instances, the I/O circuit 270 may be implemented as discussed further below with respect to FIGS. 3C-D.

The voltage comparator 280 may be configured to compare the voltage at node N2 (i.e., the output voltage of the voltage regulator 250 to a voltage value VWARN and output a signal DIAG based on an outcome of the comparison. For example, the diagnostic signal DIAG may be set to a first value (e.g., '0') when VIO is less than VWARN, and the diagnostic signal DIAG may be set to a second value (e.g., '1') when VIO is greater than or equal to VWARN. Under the nomenclature of the present disclosure, the voltage comparator 280 is also referred to as a diagnostic circuit.

Figure 3A:
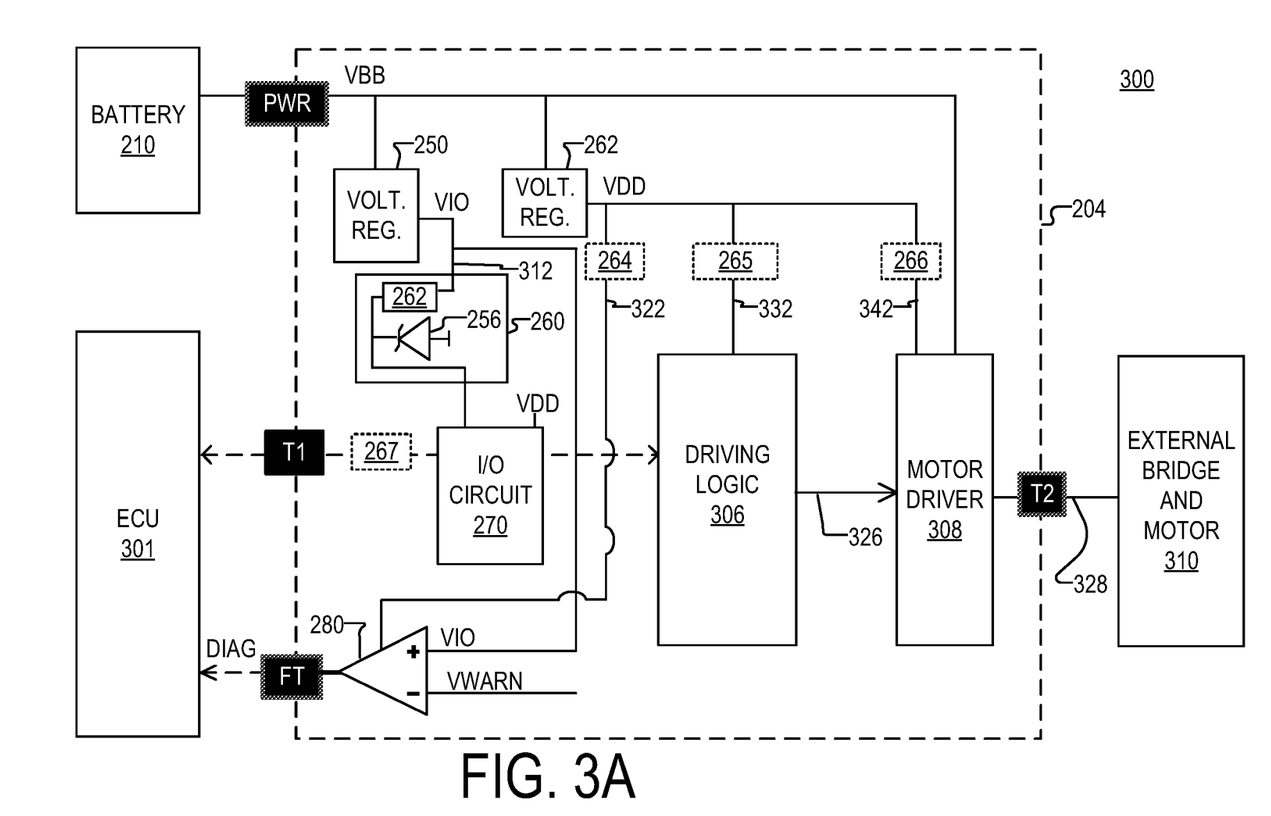
FIG. 3A is a diagram of an example of a system according to aspects of the disclosure.

In some implementations, the value of VWARN may be less than the value of the clamp voltage VCL of the Zener diode 256—for example, VCL may be equal to 6.5, VWARN may be equal to 5.7V, and the value which VIO is expected to have absent a failure of the voltage regulator 250 may be 5V. In some implementations, the value of VCL may be less than or equal to the value of the AMR for the controller 202. Additionally or alternatively, in some implementations, the value of VCL may be less than or equal to the AMR of the ECU 301 (shown in FIG. 3). By way of example, in some implementations, VCL may be equal to 85% of the AMR for the controller 202 (or the ECU 301).

The diagnostic signal DIAG may provide a notice when the value of VIO begins to exceed its normal bounds but has not yet crossed the critical threshold represented by VCL. In this way, the controller 202 (or the high-voltage element 206) may take a responsive action after the value of VIO exceeds VWARN, but before the data connection between the controller 202 and the high-voltage element is severed (as a result of the protection circuit reaching the clamp voltage VCL of the Zener diode 256).

FIG. 3A is a diagram of an example of a system 300. The system 300, according to the present example is an electric vehicle. However, alternative implementations are possible in which the system 300 includes any suitable type of electromechanical system. In some respects, FIG. 3A is provided to illustrate another possible implementation of the interface 204.

As illustrated, the system 300 may include the battery 210, an electronic control unit (ECU) 301, the interface 204, and an external bridge and motor 310 (hereinafter "motor 310"). The ECU 301 may be coupled to the motor 310 via the interface 204. The ECU 301 may include any suitable type of electronic control unit that is configured to control one or more characteristics of the operation of the motor 310, such as speed or torque, for example. The motor 310 may include any suitable type of electric motor, such as a 3-phase motor, a 5-phase motor, a 7-phase motor, etc.

According to the present example, the motor 310 is a wheel motor and the ECU 301 is the main computer of an electric vehicle. However, as noted above, the present disclosure is not limited to any specific implementation of the system 300. In this regard, it will be understood that the system 300 may be any suitable type of machinery that includes an electric motor. Furthermore, it will be understood that the ECU 301 may include any suitable type of controller, such as an industrial controller for example. Although in the example of FIG. 3A, the high voltage source used to power the interface 204 is a battery, it will be understood that alternative implementations are possible in which another high-voltage source is used instead.

In the example of FIG. 3A, the interface 204 is a motor control interface, and it includes a driving logic 306 and a motor driver 308, in addition to the voltage regulator 250, the voltage regulator 262, the protection circuit 260, the I/O circuit 270, and the voltage comparator 280. The configuration of the voltage comparator 280 and the voltage regulator 250 is discussed above with respect to FIG. 2B. The configuration of the voltage regulator 262 may be the same or similar to the voltage regulator 250. However, the present disclosure is not limited to any specific configuration of the voltage regulator 262.

The protection circuit 260 may be disposed on the circuit path 312 that couples the voltage regulator 250 with the I/O circuit 270. As discussed above with respect to FIG. 2B, the protection circuit 260 may be configured to open the circuit path 312 and disconnect the voltage regulator 250 from the I/O circuit in the event of a malfunction of the voltage regulator 250. As noted above, the protection circuit 260 may open the circuit path 312 when VIO (i.e., the voltage output by the voltage regulator 250) exceeds the breakdown voltage VCL of the Zener diode 256 or when electrical current through the protection circuit 260 exceeds the maximum restrictor current ICN of the fuse 263.

As discussed above with respect to FIG. 2B, the voltage comparator 280 may be configured to compare the value of voltage VIO to the value VWARN, and set the signal DIAG based on an outcome of the comparison. In some implementations, the diagnostic signal may be output on a fault terminal FT of the interface 204. The fault terminal FT may be coupled to a GPIO pin of the ECU 301, a direct memory access (DMA) interface of the ECU 301, and/or an interrupt controller of the ECU 301.

The driving logic 306 may include any suitable type of processing circuitry, such as an application-specific processing circuitry, or a general-purpose processing circuitry, for example. The driving logic 306 may be configured to receive data over the I/O circuit 270. The data received over the I/O circuit 270 may include one or more digital control signals that are generated by the ECU 301. The digital control may specify one or more characteristics of the operation of the motor 310, such as torque or speed for example. The driving logic 306 may be configured to generate one or more control signals 326 and provide the control signals 326 to the motor driver 308. The control signals 326 may be generated based on the data that is received over the I/O circuit 270. The control signals 326 may encode at least some of the information that is received over the I/O circuit 270. For example, if the data specifies a torque value, the control signals 326 may encode the torque value; if the data specifies a speed value, the control signals 326 may encode the speed value, etc. In addition, the driving logic 306 may output feedback to control signals provided by the ECU 301 via the I/O circuit 270. Throughout the disclosure, the term "logic" as used in the phrase "driving logic" shall refer to electronic circuitry, alone or in combination with software, that is configured to perform one or more operations.

The motor driver 308 may include any suitable type of electronic circuitry for driving the motor 310. The motor driver 308 may generate a PWM signal 328 (or another power signal) based on the control signal 326. The PWM signal 328 may be subsequently used to power the external motor and bridge. The PWM signal may be generated by modulating the current that is output by the battery 210. The PWM signal 328 may be generated so as to cause the motor 310 to operate in accordance with one or more operational parameters that are specified by the control signal 326.

According to the example of FIG. 3A, the voltage regulator 262 is arranged to step down the voltage VBB, which is provided by the battery 210, to a voltage VDD. According to the present example, VDD is equal to 5V. However, the present disclosure is not limited to any specific value of VDD.

The voltage comparator 280 may be arranged to receive power from the voltage regulator 262 via a circuit path 322. A protection circuit 264 may be optionally disposed on the circuit path 322, as shown. The protection circuit 264 may have the same or similar configuration as the protection circuit 260. The protection circuit 264 may be configured to open the circuit path 322 (and disconnect the voltage comparator 280 from the voltage regulator 262), when the voltage VDD that is output by the voltage regulator 262 exceeds a voltage threshold or when the current through the protection circuit 264 exceeds a current threshold.

The driving logic 306 may be arranged to receive power from the voltage regulator 262 via a circuit path 332. A protection circuit 265 may be optionally disposed on the circuit path 332, as shown. The protection circuit 265 may have the same or similar configuration as the protection circuit 260. The protection circuit 265 may be configured to open the circuit path 332 (and disconnect the driving logic 306 from the voltage regulator 262), when the voltage VDD that is output by the voltage regulator 262 exceeds a voltage threshold or when the current through the protection circuit 265 exceeds a current threshold.

The motor driver 308 may be arranged to receive power from the voltage regulator 262 via a circuit path 342. A protection circuit 266 may be optionally disposed on the circuit path 342, as shown. The protection circuit 266 may have the same or similar configuration as the protection circuit 260. The protection circuit 266 may be configured to open the circuit path 342 (and disconnect the motor driver 308 from the voltage regulator 262), when the voltage VDD that is output by the voltage regulator 262 exceeds a voltage threshold or when the current through the protection circuit 266 exceeds a current threshold.

In some instances, a respective protection circuit 267 may be disposed between each of the terminals T1 and the I/O circuit 270. Each protection circuit 267 may have the same or similar configuration as the protection circuit 260. Each protection circuit 267 may be configured to open the line that connects the protection circuit's 267 respective terminal T1 to the I/O circuit 270, when the voltage across the line exceeds a voltage threshold or when the current through the line exceeds a current threshold.

Any two (or all) of the protection circuits 264-267 may have the same or different voltage thresholds. Any two (or all) of the protection circuits 264-267 may have the same or different current thresholds. In some implementations, the voltage threshold of any of the protection circuits 264-267 may be less than or equal to the clamp voltage of a clamp circuit that is part of that protection circuit. In some implementations, the current threshold of any of the protection circuits 264-267 may be less than or equal to the maximum restrictor current of a current restrictor that is part of that protection circuit.

Figure 3B:
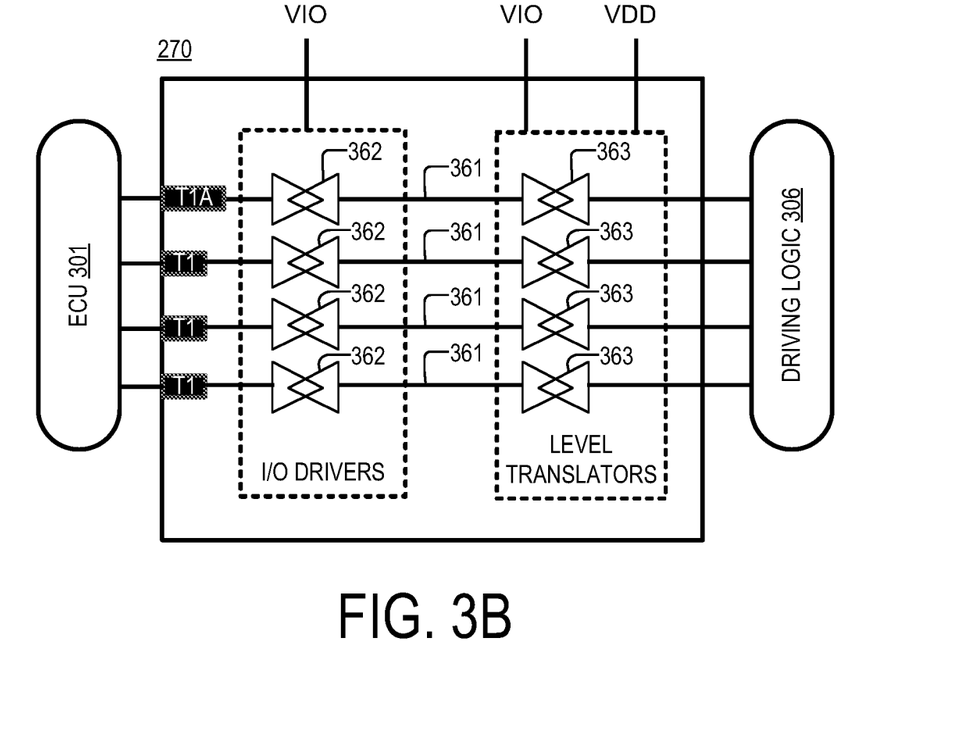
FIG. 3B is a diagram of an example of an I/O circuit, according to aspects of the disclosure.

FIG. 3B is a diagram of an example of the I/O circuit 270 in accordance with one particular implementation. As illustrated, the I/O circuit may include a plurality of lines 361. Each of lines 361 may include a respective I/O driver 362 that is coupled in series with a respective level translator 363. Each of the I/O drivers 362 may include either an input driver or an output driver.

Figure 3C:
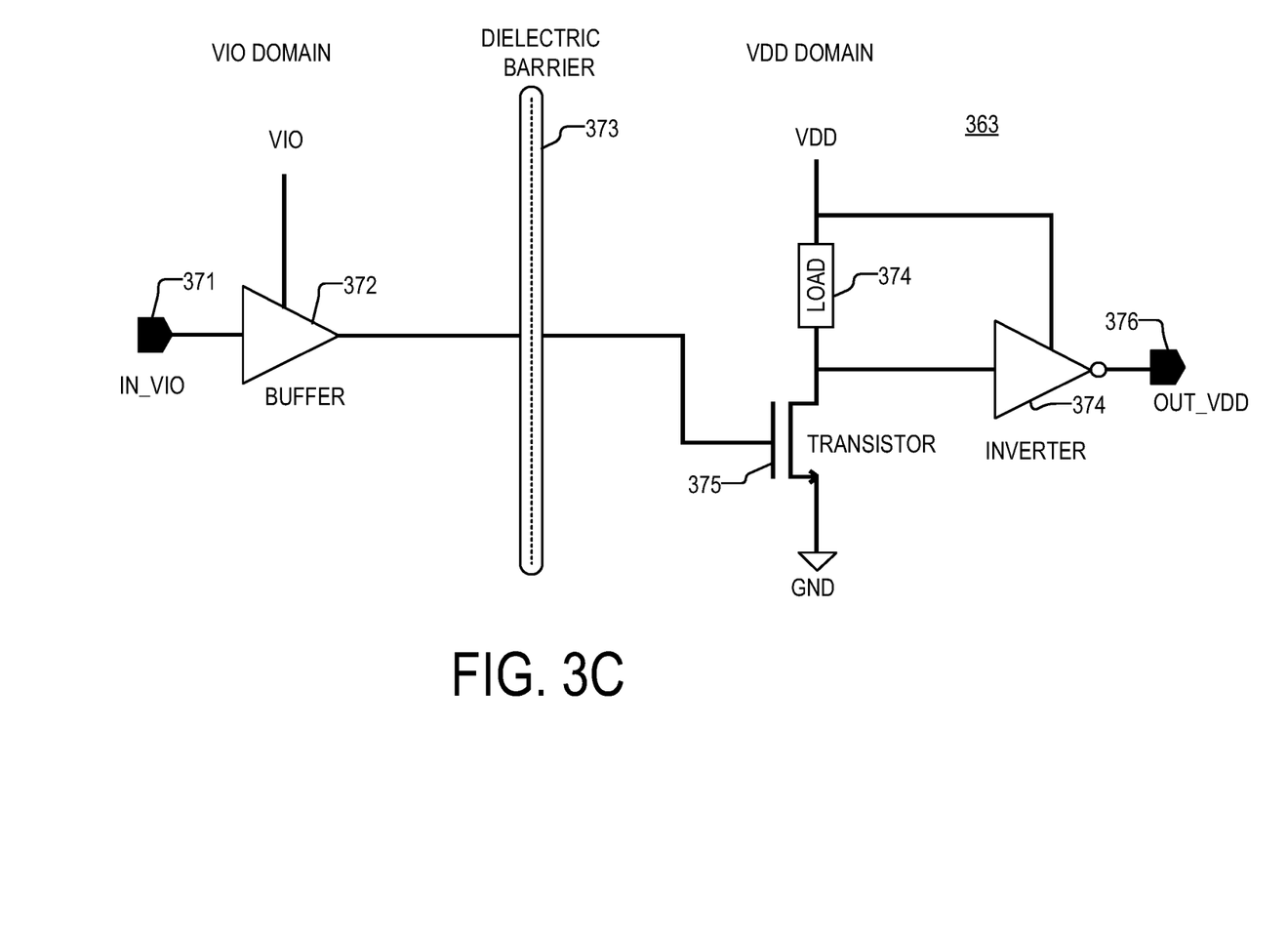
FIG. 3C is a diagram of an example of a level translator, according to aspects of the disclosure.

FIG. 3C shows an example of a level translator 363, according to aspects of the disclosure. The level translator 363 that is shown in FIG. 3C may be the same or similar to any of the level translators 363 that are shown in FIG. 3B. As illustrated, the level translator 363 may include a terminal 371 that is coupled to the input of a buffer 372 (e.g., see FIG. 3A). The buffer 372 may be powered with the voltage regulator 250, and arranged to receive the voltage VIO from the voltage regulator 250. The level translator 361 may include a load 374 that is coupled to the emitter of a transistor 375, as shown. The emitter of transistor 375 may also be coupled to the input of an inverter 366. The collector of transistor 375 may be coupled to ground. The inverter 366 may be powered with the voltage regulator 262 and arranged to receive the voltage VDD from the voltage regulator 262. The output of the inverter 374 may be coupled to a terminal 376. The terminal 376 may be coupled to the driving logic 306.

A dielectric barrier 373 may be disposed between the buffer 372 and the base of transistor 475. Specifically, the output of buffer 372 may be coupled to the dielectric barrier 373, and the base of transistor 375 may be coupled to the dielectric barrier 373. The dielectric barrier 373 may prevent current from travelling between the transistor 375 and the buffer 375. The dielectric barrier 373 may be configured to separate the voltage domain of the voltage regulator 250 from the voltage domain of the voltage regulator 262. Depending on the application and technology, the dielectric barrier 373 may be simply a MOS or other insulated-gate transistor with suitable breakdown voltage or another isolated structure.

According to the example of FIG. 3C, each of lines 361 is configured to couple a different one of the terminals T1 to a corresponding terminal of the driving logic 306. However, in the implementation discussed with respect to FIG. 2D, each of the lines 361 may be configured to couple a different one of the terminals T1 to a corresponding one of the terminals T2. In this implementation, the dielectric barrier may be configured to separate the voltage domain of the voltage regulator 250 from a voltage domain that is associated with the terminals T2. The voltage domain associated with the terminals T2 may be a voltage domain of a voltage regulator that is configured to step down the voltage VBB and power one or more components of the voltage element 206 (such as a control circuitry of the element 206).

Figure 4:
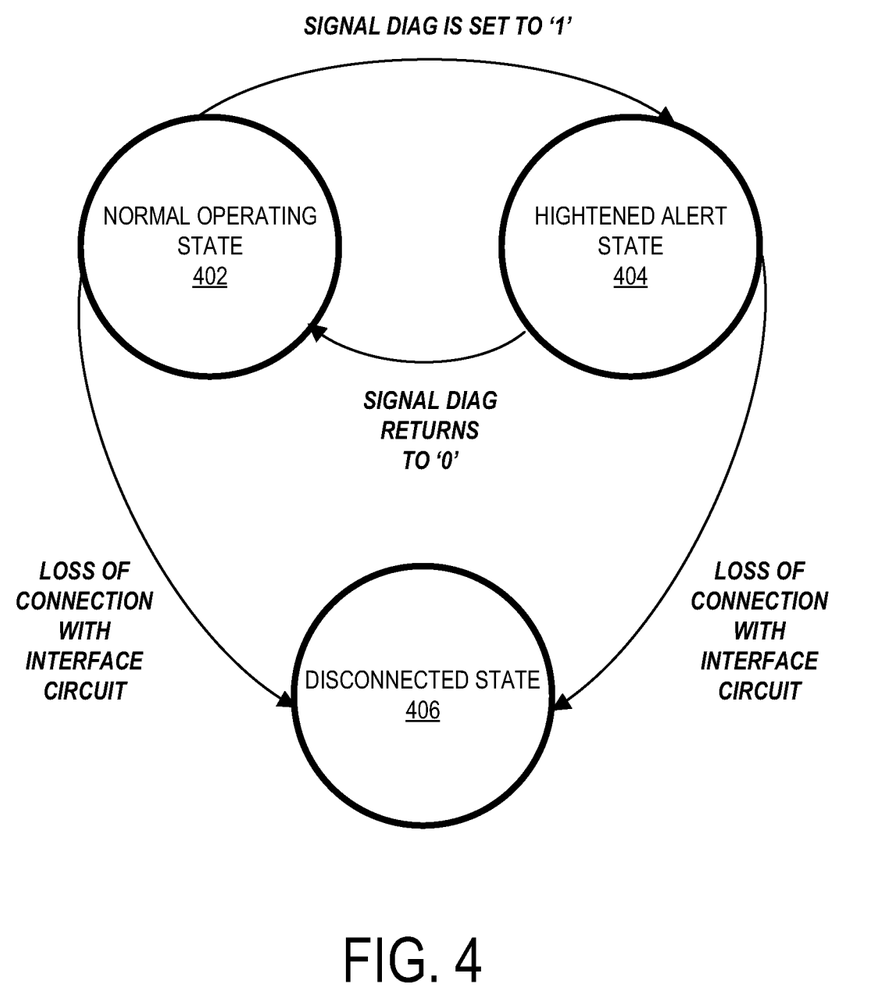
FIG. 4 is a state diagram illustrating aspects of the operation of a system, according to aspects of the disclosure.

FIG. 4 is a state diagram of illustrating aspects of the operation of the ECU 301, according to aspects of the disclosure. As illustrated, the ECU 301 may be in a normal operating state 402, in a heightened alert state 404, and in a disconnected state 406. It will be understood that FIG. 4 is provided for illustrative purposes only, and that the ECU 301 may have many other states in addition to those that are shown in FIG. 4.

When the ECU 301 is in the state 402, the ECU 301 may be able to send signals to the driving logic 306 and/or receive signals from the driving logic 306. In general, when the ECU 301 is in the state 402, the voltage VIO that is output by the voltage regulator 250 may be within normal operating bounds (e.g., less than the value VWARN).

When the ECU 301 is in the state 404, VIO may be greater than VWARN, but less than VCL. In other words, when the ECU 301 is in the state 404, the ECU 301 may be still in possession of the ability to send and receive signals from the driving logic 306 of the interface 204, but it may also be on the way of losing this ability. While the ECU 301 is in the state 404, the ECU 301 may perform actions that are aimed at" (i) preparing the system 300 for the eventuality of the communication between the ECU 301 and the driving logic 306 being severed, and/or (ii) returning the system to a state in which the value of VIO is less than VWARN and VCL. For example, in some implementations, when the system 300 is in the state 404, the system 300 may cause the driving logic 306 to begin operating autonomously of the ECU 301 or turn off the motor 310. Additionally or alternatively, as noted above, when the ECU 301 is in the state 404, the ECU 301 may take a corrective action aimed at returning the ECU 301 to a state in which the value of VIO is less than VWARN an VCL. For example, the corrective action may include switching the I/O circuit 270 to an alternative power supply. The alternative power supply may be another voltage regulator that is provided in the interface 204 as a backup for voltage regulator 250.

When the ECU 301 is in the state 406, the circuit path 322 may be open and the I/O circuit 270 may be turned off. As a result, the ECU 301 may be disconnected from the driving logic 306 and/or the motor driver 308 of the interface 204.

In one example, the ECU 301 may transition from state 402 to state 404 when the diagnostic signal DIAG is set to logic-high. The ECU 301 may transition from state 404 to state 406 when connection is lost with the driving logic 306 of the interface 204. The ECU 301 may transition from state 402 directly to state 406 when connection is lost with the driving logic 306 of the interface 204. The ECU 301 may return from state 404 to state 402 when the value of the diagnostic signal DIAG is set back to logic-low (e.g., as a result of the value of the voltage supplied to the I/O circuit 270 falling below the value of VWARN).

As discussed above with respect to FIGS. 2B and 3, the value of VWARN may be less than the clamp voltage VCL of the protection circuit 260, and the clamp voltage VCL may be less than or equal to the AMR of the ECU 301. The diagnostic signal DIAG may be set to a logic-high in response to the voltage VIO that is output by the voltage regulator 250 exceeding VWARN, and it may return to logic-low in response to VIO falling below VIO. The I/O circuit 270 may be turned off when the VIO exceeds VCL and/or when the current through the protection circuit 260 exceeds the maximum restrictor current ICN of the protection circuit 260. The interface circuit 204 may be implemented as an integrated circuit and packaged by using any suitable type of semiconductor packaging technology.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used throughout the disclosure, the term product may include a physical object that is being bought and sold, a service, and/or anything else that can be purchased and solved. FIGS. 2A-4 are provided as an example only.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. An interface circuit, comprising:
an input-output (I/O) circuitry that is configured to couple one or more first terminals with one or more second terminals, the I/O circuitry including circuitry to receive a data set at a plurality first terminals of the interface circuit and output the data set on a plurality of second terminals of the interface circuit, the I/O circuitry including a plurality of level translators, each level translator being coupled between a different respective one of the first terminals and a different respective one of the second terminals;
a voltage regulator configured to power the I/O circuitry;
a fuse that is disposed between the voltage regulator and the I/O circuitry, the fuse being disposed on a circuit path that connects the voltage regulator to the I/O circuitry, the fuse being configured to open the circuit path and disconnect the voltage regulator from the I/O circuitry when an electrical current that is being supplied to the I/O circuitry exceeds a threshold;
a Zener diode that is coupled to the circuit path that connects the voltage regulator to the I/O circuitry, the Zener diode being configured to increase the electrical current that is being supplied to the I/O circuitry and cause the fuse to disconnect the I/O circuitry from the voltage regulator when the voltage that is input into the I/O circuitry exceeds a clamping voltage of the Zener diode; and
a diagnostic circuit that is configured to: (i) compare a reference voltage to a voltage that is output by the voltage regulator, and (ii) when the voltage that is output by the voltage regulator matches the reference voltage value, output an indication that the voltage regulator is malfunctioning,
wherein the reference voltage is less than the clamping voltage of the Zener diode.

2. The interface circuit of claim 1, wherein the I/O circuitry includes at least one I/O driver that is coupled in series with a level translator.

3. The interface circuit of claim 1, wherein the diagnostic circuit is powered by a voltage source that is disposed outside of the circuit path that connects the voltage regulator to the I/O circuitry.

4. The interface circuit of claim 1, wherein each of the level translators is configured to provide a dielectric barrier that is arranged to separate a voltage domain of the voltage regulator from a voltage domain that is associated with the second terminal that is coupled to the level translator.

5. An interface circuit, comprising:
a diagnostic terminal;
an input-output (I/O) circuitry that is configured to couple one or more first terminals with one or more second terminals, the I/O circuitry including circuitry to receive a data set at a plurality first terminals of the interface circuit and output the data set on a plurality of second terminals of the interface circuit, the I/O circuitry including a plurality of level translators, each level translator being coupled between a different respective one of the first terminals and a different respective one of the plurality of second terminals;
a voltage regulator configured to power the I/O circuitry; and
a restrictor element configured to disconnect the voltage regulator from the I/O circuitry when an overvoltage event occurs in the interface circuit;
a diagnostic circuit that is configured to: (i) compare a first voltage value to a voltage that is output by the voltage regulator, and (ii) when the voltage that is output by the voltage regulator matches the first voltage value, output, on the diagnostic terminal, an indication that the interface circuit is in a state in which there is an increased likelihood for the I/O circuitry to be turned off as a result of the overvoltage event occurring, the overvoltage event occurring when the voltage supplied by the voltage regulator crosses a second voltage value, the second voltage value being greater than the first voltage value.

6. The interface circuit of claim 5, wherein the diagnostic circuit is powered by a voltage source that is disposed outside of a circuit path that connects the voltage regulator to the I/O circuitry.

7. The interface circuit of claim 5, wherein the restrictor element includes a fuse.

8. The interface circuit of claim 5, wherein each of the level translators is configured to provide a dielectric barrier that is arranged to separate a voltage domain associated with the first terminal that is coupled to the level translator from a voltage domain that is associated with the second terminal is coupled to the level translator.

9. The interface circuit of claim 5, further comprising a voltage suppressor wherein the voltage suppressor is configured to increase an electrical current that is being supplied to the I/O circuitry and cause the restrictor element to disconnect the I/O circuitry from the voltage regulator when the voltage that is output by the voltage regulator has exceeded the first voltage value by a predetermined amount.

10. The interface circuit of claim 9, wherein the voltage suppressor includes a Zener diode.

11. The interface circuit of claim 9, wherein the restrictor element includes a fuse, and the voltage suppressor includes a clamp circuit.

12. An interface circuit, comprising:
an input-output (I/O) circuitry that is configured to couple one or more first terminals with one or more second terminals, the I/O circuitry including circuitry to receive a data set at a plurality first terminals of the interface circuit and output the data set on a plurality of second terminals of the interface circuit, the I/O circuitry including a plurality of level translators, each level translator being coupled between a different respective one of the first terminals and a different respective one of the plurality of second terminals;
a voltage regulator configured to power the I/O circuitry;
a restrictor element that is disposed between the voltage regulator and the I/O circuitry, the restrictor element being disposed on a circuit path that connects the voltage regulator to the I/O circuitry, the restrictor element being configured to open the circuit path and disconnect the voltage regulator from the I/O circuitry when an electrical current that is being supplied to the I/O circuitry exceeds a first threshold; and
a voltage suppressor that is coupled to the circuit path that connects the voltage regulator to the I/O circuitry, the voltage suppressor being configured to limit a voltage that is input into the I/O circuitry; and
a diagnostic circuit that is configured to: (i) compare a second threshold to a voltage that is output by the voltage regulator, and (ii) when the voltage that is output by the voltage regulator matches the second threshold, output an indication that the voltage regulator is malfunctioning, wherein the second threshold is less than the first threshold.

13. The interface circuit of claim 12, wherein the voltage suppressor is configured to increase the electrical current that is being supplied to the I/O circuitry and cause the restrictor element to disconnect the I/O circuitry from the voltage regulator when the voltage that is input into the I/O circuitry is equal to the first threshold or has exceeded the first threshold by a predetermined amount.

14. The interface circuit of claim 12, wherein each of the level translators is configured to provide a dielectric barrier that is arranged to separate a voltage domain of the voltage regulator from a voltage domain that is associated with the second terminal that is coupled to the level translator.

15. The interface circuit of claim 12, wherein the restrictor element includes a fuse, and the voltage suppressor includes a clamp circuit.

16. An interface circuit, comprising:
an input-output (I/O) circuit;
a motor driver that is configured to drive a motor with an electrical current that is provided by a battery;
a control logic that is configured to receive a control signal from an electronic control unit (ECU) and operate the motor driver based on the control signal, the control signal being received via the I/O circuit, the I/O circuit including circuitry to receive a control signal at a plurality of input terminals and output the control signal to the control logic, the I/O circuit including a plurality of level translators, each level translator being coupled between a different respective one of the input terminals and the control logic; and
a first voltage regulator that is arranged to power the I/O circuit with the electrical current that is provided by the battery, the first voltage regulator being configured receive a same voltage as a voltage that is output by the battery and step down the received voltage;
a restrictor element configured to disconnect the first voltage regulator from the I/O circuit when an overvoltage event occurs in the interface circuit;
a diagnostic circuit that is configured to: (i) compare a first voltage value to a voltage that is output by the first voltage regulator, and (ii) when the voltage that is output by the first voltage regulator matches the first voltage value, output, on a diagnostic terminal, an indication that the interface circuit is in a state in which there is an increased likelihood for the I/O circuit to be turned off, the overvoltage event occurring when the voltage supplied by the first voltage regulator crosses a second voltage value, the second voltage value being greater than the first voltage value.

17. The interface circuit of claim 16, wherein the restrictor element includes a fuse.

18. The interface circuit of claim 16, further comprising a voltage suppressor that is coupled to a circuit path that connects the first voltage regulator to the I/O circuit, the voltage suppressor being configured to cause the diagnostic circuit to disconnect the first voltage regulator from the I/O circuit when the voltage that is being supplied by the first voltage regulator to the I/O circuit exceeds the first voltage.

19. The interface circuit of claim 18, wherein the diagnostic circuit is powered by a second voltage regulator that is disposed outside of the circuit path that connects the first voltage regulator to the I/O circuit, the second voltage value being less than the first voltage value.

20. The interface circuit of claim 16, wherein each of the level translators is configured to provide a dielectric barrier.

21. A system, comprising:
a battery;
a motor;
an ECU that is configured to a generate a control signal;
an interface circuit that is configured to couple the motor to the ECU, the interface circuit including:
an I/O circuit;
a motor driver that is configured to drive the motor with an electrical current that is provided by the battery;
a control logic that is configured to receive the control signal from the ECU, via the I/O circuit, and operate the motor driver based on the control signal, the I/O circuit including circuitry to receive the control signal at a plurality of input terminals and output the control signal to the control logic, the I/O circuit including a plurality of level translators, each level translator being coupled between a different respective one of the input terminals and the control logic; and
a first voltage regulator that is arranged to power the I/O circuit with the electrical current that is provided by the battery, the first voltage regulator being configured receive a same voltage as a voltage that is output by the battery and step down the received voltage; and
a restrictor element being configured to disconnect the first voltage regulator from the I/O circuit when a voltage that is being supplied by the first voltage regulator the I/O circuit exceeds a first threshold, and
a diagnostic circuit that is configured to: (i) compare a second threshold to a voltage that is output by the first voltage regulator, and (ii) when voltage that is output by the first voltage regulator matches the second threshold, output, the ECU, an indication that the first voltage regulator is malfunctioning,
wherein the second threshold is less than the first threshold.

22. The system of claim 21, wherein the restrictor element includes a fuse.

23. The system of claim 21, wherein the interface circuit further includes a voltage suppressor that is coupled to a circuit path that connects the first voltage regulator to the I/O circuit, the voltage suppressor being configured to cause the diagnostic circuit to disconnect the first voltage regulator from the I/O circuit when the voltage that is being supplied by the first voltage regulator to the I/O circuit exceeds the first threshold.

24. The system of claim 23, wherein the diagnostic circuit is powered by a second voltage regulator that is disposed outside of the circuit path that connects the first voltage regulator to the I/O circuit.

25. The system of claim 21, wherein each of the level translators is configured to provide a dielectric barrier.

* * * * *